(12) United States Patent
Hinterdorfer et al.

(10) Patent No.: US 12,090,488 B2
(45) Date of Patent: Sep. 17, 2024

(54) METHOD FOR DETECTING WEAR IN CRUSHERS DURING IDLE OPERATION

(71) Applicant: Rubble Master HMH GmbH, Linz (AT)

(72) Inventors: Christian Hinterdorfer, Gutau (AT); Christian Hinterreiter, Obergrünburg (AT)

(73) Assignee: Rubble Master HMH GmbH, Linz (AT)

( * ) Notice: Subject to any disclaimer, the term of this patent is extended or adjusted under 35 U.S.C. 154(b) by 190 days.

(21) Appl. No.: 17/799,998

(22) PCT Filed: May 10, 2021

(86) PCT No.: PCT/AT2021/060163
§ 371 (c)(1),
(2) Date: Aug. 16, 2022

(87) PCT Pub. No.: WO2021/226647
PCT Pub. Date: Nov. 18, 2021

(65) Prior Publication Data
US 2023/0082463 A1    Mar. 16, 2023

(30) Foreign Application Priority Data
May 13, 2020    (AT) .............................. A 50418/2020

(51) Int. Cl.
*B02C 25/00*    (2006.01)
*B02C 13/04*    (2006.01)
(Continued)

(52) U.S. Cl.
CPC .............. *B02C 25/00* (2013.01); *B02C 13/04* (2013.01); *G06T 7/0004* (2013.01); *G06T 7/50* (2017.01);
(Continued)

(58) Field of Classification Search
CPC ......... B02C 25/00; B02C 13/04; B02C 13/09; B02C 13/02; B02C 13/095; B02C 2210/01
See application file for complete search history.

(56) References Cited

U.S. PATENT DOCUMENTS

| | | | |
|---|---|---|---|
| 10,603,674 B2 * | 3/2020 | Salonen | B02C 13/095 |
| 2003/0038196 A1 * | 2/2003 | Moriya | B02C 13/095 241/30 |

(Continued)

FOREIGN PATENT DOCUMENTS

| | | | |
|---|---|---|---|
| DE | 3911086 C2 * | 10/1994 | ........... B02C 13/095 |
| DE | 102004005378 A1 | 8/2005 | |

(Continued)

OTHER PUBLICATIONS

English language abstract for JP 2018 187 55 12 A, Nov. 29, 2018.

(Continued)

*Primary Examiner* — Faye Francis
(74) *Attorney, Agent, or Firm* — Tiajoloff & Kelly LLP

(57) ABSTRACT

A method for detecting wear in crushers, having a wearing part (2) mounted on a drive shaft (1), during idle operation is described in which downtimes that impair crusher productivity can be eliminated and nevertheless reliable wear detection is made possible with low risk of injury to machine operators. The drive shaft (1) is accelerated from a starting angular speed (ω1) to an end angular speed (ω2) with a specified acceleration, and the drive energy required for this is ascertained, whereupon the wear of the wearing part (2) is ascertained as the value assigned to the required drive energy in a specified wearing-part characteristic curve (3, 4, 5).

18 Claims, 3 Drawing Sheets

(51) Int. Cl.
 *G06T 7/00* (2017.01)
 *G06T 7/50* (2017.01)
 *G06T 7/62* (2017.01)

(52) U.S. Cl.
 CPC ............ *G06T 7/62* (2017.01); *B02C 2210/01* (2013.01); *G06T 2207/10028* (2013.01); *G06T 2207/20081* (2013.01); *G06T 2207/20084* (2013.01); *G06T 2207/30128* (2013.01); *G06T 2207/30164* (2013.01)

(56) References Cited

U.S. PATENT DOCUMENTS

| | | | |
|---|---|---|---|
| 2006/0131453 A1* | 6/2006 | Barscevicius | B02C 13/095 241/36 |
| 2006/0243839 A9* | 11/2006 | Barscevicius | B02C 7/11 241/261.2 |
| 2015/0209797 A1 | 7/2015 | Salonen | |
| 2019/0168227 A1* | 6/2019 | Forsberg | B02C 13/26 |
| 2020/0171508 A1 | 4/2020 | Salonen | |

FOREIGN PATENT DOCUMENTS

| | | | | |
|---|---|---|---|---|
| EP | 1287893 A3 * | 6/2004 | | B02C 13/095 |
| JP | 2018187551 A | 1/2014 | | |
| WO | 2014/001606 A1 | 1/2014 | | |

OTHER PUBLICATIONS

English language abstract for DE 10 2004 005378 A1, Aug. 11, 2005.

U.S. Appl. No. 17/795,514, filed Jul. 26, 2022 (U.S. national stage of PCT/AT2021/060140) for Method for Cleaning Blinding Particles in Crushers.

U.S. Appl. No. 17/799,998, filed Aug. 16, 2022 (U.S. national stage of PCT/AT2021/060163) for Method for Detecting Wear in Crushers During Idle Operation, (this application).

U.S. Appl. No. 17/800,010, filed Aug. 16, 2022 (U.S. national stage of PCT/AT2021/060169) for Method for Controlling a Crusher.

U.S. Appl. No. 17/800,031, filed Aug. 16, 2022 (U.S. national stage of PCT/AT2021/060162) for Method for Determining, in Parts, The Volume of a Bulk Material Fed Onto a Conveyor Belt.

U.S. Appl. No. 17/800,041, filed Aug. 16, 2022 (U.S. national stage of PCT/AT2021/060165) for Method of Dust Suppression for Crusherswith Spraying Devices.

U.S. Appl. No. 17/785,800, filed Jun. 15, 2022 (U.S. national stage of PCT/AT2021/060141) for Method for Determining the Bulk Density of Bulk Material in a Mobile Crusher.

U.S. Appl. No. 17/789,877, filed Jun. 29, 2022 (U.S. national stage of PCT/AT2021/060164) for Method for Determining the Particle Size Distribution of Parts of a Bulk Material Fed Onto a Conveyor Belt, and.

U.S. Appl. No. 17/784,351, filed Jun. 10, 2022 (U.S. national stage of PCT/AT2021/060011) for Device for a Crusher.

* cited by examiner

METHOD FOR DETECTING WEAR IN CRUSHERS DURING IDLE OPERATION

FIELD OF THE INVENTION

The invention relates to a method for detecting wear in crushers during idle operation with a wearing part mounted on a drive shaft.

DESCRIPTION OF THE PRIOR ART

In connection with crushers, such as impact crushers, which are used for the industrial processing of mineral bulk material, the high pressure and friction forces occurring during the treatment process lead over time to wear of the highly stressed wearing part mounted on a drive shaft of the crusher. In the case of impact crushing, the wearing part may particularly comprise one or more impact bars arranged on a crusher rotor, which interact with an impact plate to form a crushing gap. Due to wear, deviations of the actual crushing gap from the specified nominal crushing gap of the crusher may gradually occur, so that the machine operator has to readjust the crushing gap to enable a constant grain diameter of the output grain produced by the crusher. In addition, if the wearing part is subject to correspondingly heavy wear, it must also be replaced after a certain period of use.

With this in mind, the crushing gap is usually re-measured manually at regular intervals when the crusher is at a standstill, so that the machine operator can adjust the crushing gap to the specified nominal value again on the basis of this measurement or determine that the wearing part needs to be replaced. The disadvantage of this, however, is that apart from the reduced crusher productivity due to the downtimes required for wear determination, measurement errors by the machine operator can also occur. If, for example, a crushing gap value measured incorrectly between a dummy bar and an impact plate were to be used as a starting point for readjusting the crushing gap, this measure could, in the worst case, result in damage to the crusher, which could sometimes be dangerous for bystanders. Not least for this reason, and because the machine operator must manually intervene in the crushing chamber to measure the crushing gap, the machine operator is exposed to a far from inconsiderable risk of injury.

SUMMARY OF THE INVENTION

There is thus a need to create a method of the type described at the outset, so that downtimes that impair crusher productivity can be eliminated, while still enabling reliable wear detection with a low risk of injury for the machine operator.

The invention solves the problem posed by accelerating the drive shaft from a starting angular velocity to an end angular velocity with a predetermined acceleration and determining the drive energy required for this purpose, whereupon the wear of the wearing part is determined as the value assigned to the required drive energy in a specified wearing-part characteristic curve.

As a result of these measures, the wear of the wearing part can be reliably determined when the crusher is running empty, i.e. without material being fed in, so that manual intervention in the crushing chamber can be dispensed with. The invention is based on the consideration that the loss of mass caused by the wear as well as the change in geometry of the wearing part leads to a change in the moment of inertia of the wearing part on the drive shaft and thus to a change in the required drive power under the same acceleration conditions. Consequently, in accordance with the method according to the invention, for example, a drive power measurement of the crusher is carried out for the predetermined acceleration process and the required energy input is determined therefrom. A corresponding wear value is assigned to the energy expenditure determined in the course of the predetermined acceleration process in accordance with a predetermined wearing-part characteristic curve, so that the wear of the wearing part can be determined on the basis of the deviation of the measured drive power from the required drive power in the wear-free state. In order to determine the wearing-part characteristic curve, in the case of an impact crusher for a predetermined arrangement of the wearing part on the drive shaft with a predetermined wearing part density or geometry, and thus a known moment of inertia, a reference run can first be performed at a predetermined acceleration from a starting angular velocity to an end angular velocity. As described above, the drive power can be measured, which in turn can be used to determine the reference energy required for the acceleration process. For example, under the simplified assumption of a cuboid wearing part and assuming uniformly occurring wear, this reference energy expenditure can be assigned the wear value 0 in relation to the change in the geometry of the wearing part. In order to subsequently determine a wearing-part characteristic curve, the theoretical energy expenditure during the specified acceleration run can be determined for any wear values by determining its mass via the geometry change of the wearing part at a specified density of the wearing part and the required drive power via the moment of inertia acting on the drive shaft and thus the theoretical energy expenditure during acceleration from a starting angular velocity to an end angular velocity. In the simplest case, this is a quadratic function, linearized about a development point, of the energy expenditure required for the given acceleration process as a function of the change in the geometry of the wearing part. For example, the change in length of the wearing part in a wear direction can be taken as the wear.

In this context, it is recommended that the specified wearing-part characteristic curve for the arrangement of the wearing part on the drive shaft is selected from a wearing-part characteristic curve set of possible different arrangements. This means that initially a separate wearing-part characteristic curve is created for each of the different arrangements of the wearing part on the drive shaft, with the different wearing-part characteristic curves being combined to form a wearing-part characteristic curve set and stored in a wearing-part characteristic curve memory, for example. Such an arrangement can depend, for example, on the number of impact bars mounted on the drive shaft and their material properties, geometry and/or degree of wear, but also on the number of dummy bars, if any, also provided on the drive shaft for mass compensation. If a certain arrangement of the wearing part is thus installed on the drive shaft at the crusher, the machine operator can select the wearing-part characteristic curve corresponding to that arrangement from the set of wearing-part characteristic curves. In order to avoid a manual, possibly error-prone selection by the machine operator, the wearing part or its elements can be provided with a machine-readable identification, so that when the elements of the wearing part are installed, the respective arrangement can be detected by correspondingly arranged sensors and the corresponding wearing-part characteristic can be selected from the set of wearing-part characteristic curves. The identification can be formed by an RFID transponder, for example.

In order to be able to determine not only the wear on the wearing part but also the total wear determining the crushing gap, it can be provided according to the invention that the wearing part is one or more impact bars of an impact crusher interacting with an impact plate, wherein for the output grain of which impact crusher that actual reference grain diameter is determined which is larger than the respective grain diameter of a predetermined volume fraction of the output grain, wherein the total wear is determined as the difference between an actual crushing gap associated with the actual reference grain diameter and a predetermined nominal crushing gap. In the context of impact crushers, screen analyses of the output grain or analyses of the grain size distributions of the output grain have shown that the reference grain diameter, which is larger than the respective grain diameter of a predetermined volume fraction of the output grain, is characteristic of the crushing gap, although this reference grain diameter need not correspond to the crushing gap depending on the predetermined volume fraction. If a known crushing gap is thus associated with the reference grain diameters, the wear can be determined as the change in this crushing gap as the reference grain diameters change. A reliable determination of the reference grain diameters and the associated crushing gaps can be made if the predetermined volume fraction of the output grain, i.e. the screen passage, is less than 90%. At a particularly preferred predetermined volume fraction of 75 to 85%, preferably at 80%, the reference grain diameter corresponds approximately to the crushing gap forming between the wearing part and the impact plate. This means that 90%, preferably between 75 and 85% and in particular 80% of the volume fraction of the output grain is smaller than the reference grain diameter.

If the total wear is known, the impact rocker can be moved closer to the wearing part by the amount of the total wear for a specified nominal crushing gap of the impact crusher. Thus, the actual crushing gap corresponds to the specified nominal crushing gap despite the wear-related material degradation.

In impact crushers with a wearing part formed by one or more impact bars, it is desirable to also reliably determine the wear of the impact plates cooperating with the impact bars without manual intervention in the crushing chamber. Therefore, it is proposed that for the output grain of the impact crusher that actual reference grain diameter is determined which is larger than the respective grain diameter of a predetermined volume fraction of the output grain, wherein the impact plate wear is determined as the difference between an actual crushing gap associated with the actual reference grain diameter and the sum of the wear of an impact bar and a predetermined nominal crushing gap. With known wear on the wearing part, the wear on the impact plate can thus be determined.

An assignment of reference grain diameters and crushing gap depends on the respective crushed material and on other crusher parameters, such as the impact bar configuration. Therefore, in order to enable a reliable determination of the crushing gap for a specific reference grain diameter, it is proposed that for wearing parts with known wear, for example in the wear-free state, the reference grain diameter is determined for different, defined crushing gaps, which reference grain diameter is larger than the respective grain diameter of a predetermined volume fraction of the output grain and is assigned to the respective crushing gap in a crushing gap characteristic curve. To determine the wear and, subsequently, the wear on the impact plate, several crushing gap characteristic curves can be determined as a crushing gap characteristic field depending on the predetermined wearing part arrangement, type of crushed material and other crusher parameters, from which the respective suitable crushing gap characteristic curve can be selected during operation. In order to accelerate the determination of the required reference grain diameters for a given crushing gap, reference grain diameters can be determined only for individual crushing gap settings and interpolated to a crushing gap characteristic curve.

In the event that the wearing parts wear unevenly along their longitudinal axis parallel to the axis of rotation of the drive shaft, the crushing gap, which is thus also uneven, can lead to an undesirable grain size distribution and consequently to a lower product quality of the output grain. Against this background, it is recommended that the actual reference grain diameter transverse to the conveying direction of the output grain is determined at different points and the resulting impact plate wear is determined for each point. For this purpose, it is only necessary to determine the actual reference grain diameter separately for several areas of the output grain lying next to each other transversely to the conveying direction and to carry out the method according to the invention for each of these areas. In contrast, the crushing gap characteristic curve, which is determined in the case of a wearing part with known wear, for example in the wear-free state, can be determined for the entire output grain. In principle, known photogrammetric methods, which are realized for example with the aid of a stereo camera and laser triangulation, can be used for in-situ determination of the reference grain diameter that is larger than the respective grain diameter of a specified volume fraction of the output grain. However, their disadvantage is their limited detection and processing speed, so that the conveying speeds of the material streams or the belt speed of the conveyor unit must be reduced accordingly for reliable determination of the largest grain diameter. Even with complex systems that require a large amount of space, only belt speeds of less than 2 m/s can be achieved in this way. However, this also reduces the overall throughput and thus the efficiency of the crushing process. Furthermore, in such processes the grains must not overlap on the conveying unit, which is, however, unavoidable in realistic conveying operation.

Against this background, in order to reliably detect the reference grain diameter, which is larger than the respective grain diameter of a predetermined volume fraction of the output grain, even in the case of overlaps, at conveying speeds of more than 2 m/s, without having to take constructively complex measures for this purpose, it is proposed that a depth image of the output grain conveyed past the depth sensor is detected in sections in a detection area by a depth sensor, wherein the acquired two-dimensional depth image is fed to a previously trained convolutional neural network, which has at least three convolutional layers lying one behind the other and a downstream reference grain diameter classifier, which can be designed, for example, as a so-called fully connected layer and whose output value is output as a reference grain diameter, which is larger than the respective grain diameter of a predetermined volume fraction of the output grain. However, the reference grain diameter classifier can also be formed by several volume classifiers, which are assigned to the classes of a grain size histogram sorted in ascending order of size. This has the particular advantage that the predefined volume fraction can be changed subsequently, i.e. after the neural network has been trained. However, the reference grain diameter classifier can also be formed from several volume classifiers, which are assigned to the classes of a screen characteristic sorted in ascending order of size, so that the volume fraction or screen passage can be determined more easily. This is based on the consideration that when two-dimensional depth images are used, the information required for reference grain diameter determination can be extracted from the depth information after a neural network used for this purpose has been trained with training depth images with known reference grain diameters. The convolutional layers thereby reduce the input depth images to a series of individual features, which in turn are evaluated by the downstream reference grain diameter classifier, so that as a result the reference grain diameter, which is larger than the respective grain diameter of a given volume fraction of the output grain mapped in the input depth image, can be determined. The number of convolutional layers provided, each of which may be followed by a pooling layer for information reduction, may be at least three, preferably five, depending on the available computing power. Between the convolutional layers and the downstream reference grain diameter classifier, a dimension reduction layer, a so-called flattening layer, can be provided in a known manner. Since in the depth image the distance of the imaged output grain to the depth sensor is mapped with only one value per pixel, the amount of data to be processed can be reduced in contrast to the processing of color images, the measurement procedure can be accelerated and the memory requirement necessary for the neural network can be reduced. As a result, the neural network can be implemented on inexpensive AI parallel computing units with GPU support and the method can be used regardless of the color of the bulk material. Also, the reference grain diameter can be determined by accelerating the measurement method even at conveyor belt speeds of 3 m/s, preferably 4 m/s. The mentioned reduction of the amount of data in the depth image and thus in the neural network additionally lowers the error rate for the correct determination of the reference grain diameter, which is larger than the respective grain diameter of a given volume fraction of the output grain. In contrast to color or grayscale images, the use of depth images has the additional advantage that the measurement procedure is largely independent of changing exposure conditions. For example, a vgg16 network (Simonyan/Zisserman, Very Deep Convolutional Networks for Large-Scale Image Recognition, 2015), which is usually only used for color images, can be used as the neural network, which is reduced to only one channel, namely for the values of the depth image points. For example, the depth image can be acquired using a 3D camera, since it can be placed above the output grain in the crusher due to its smaller footprint, even when space is limited. Furthermore, in order to compensate for fluctuations in the acquisition of the grain size distribution and/or the volume and to compensate for erroneous output values of the neural network, several successive output values can be averaged and the average value can be output as the grain size distribution present in the acquisition area and/or as the material volume present in the acquisition area. Training the neural network becomes more difficult and the measurement accuracy decreases during operation if elements not related to the output grain lie within the detection range of the depth sensor. These include, for example, vibrating components of a conveyor belt itself, or other machine elements. To avoid the resulting disturbances, it is proposed that the values of those pixels are removed from the depth image and/or the training depth image whose depth corresponds to a pre-detected distance between the depth sensor and a background for this pixel or exceeds this distance. This allows disturbing image information, caused for example by vibrations of the conveyor belt, to be removed and both the depth images and the training depth images to be limited to the information relevant for the measurement. Training the neural network requires large amounts of training depth images that represent the output grain to be acquired as accurately as possible. However, the amount of work required to measure the necessary amount of output grain is extremely high. In order to provide the neural network with sufficient training depth images to determine the reference grain diameter, it is proposed to first acquire sample depth images of one sample grain each with a known grain diameter and store them together with the grain diameter, whereupon several sample depth images are randomly combined to form a training depth image, to which the reference grain diameter of the combined sample depth images is assigned, whereupon the training depth image is fed to the neural network on the input side and the assigned reference grain diameter is fed to the neural network on the output side, and the weights of the individual network nodes are adjusted in a learning step. The training method is therefore based on the idea that by combining sample depth images of measured sample grains, manifold combinations of training depth images can be created. Thus, it is sufficient to acquire sample depth images of relatively few sample grains with their grain diameter to generate a large number of training depth images with which the neural network can be trained. To train the neural network, the weights between the individual network nodes are adjusted in a known manner in the individual training steps so that the actual output value corresponds as closely as possible to the specified output value at the end of the neural network. Different activation functions can be specified at the network nodes, which are decisive for whether a sum value present at the network node is passed on to the next level of the neural network. For depth image processing, it is also proposed here that the values of those pixels are removed from the depth image whose depth corresponds to a pre-detected distance between the depth sensor and the background for this pixel or exceeds this distance. As a result, the training depth images and the depth images of the measured output grain have only the information relevant for the measurement, thus achieving a more stable training behavior and increasing the recognition rate in the application. By selecting the sample depth images or the training depth images composed of them, the neural network can be trained on any type of bulk material.

To further improve the training behavior and recognition rate, it is proposed that the sample depth images with random alignment are combined to form a training depth image. Thus, for a given number of grains per sample depth image, the number of possible arrangements of the grains is significantly increased without the need to generate more sample depth images and overfitting of the neural network is avoided. Separation of the grains of the output grain can be omitted and larger output grain quantities can be determined at constant conveyor belt speed if the sample depth images with partial overlaps are combined to form a training depth image, wherein the depth value of the training depth image in the overlap area corresponds to the smallest depth of both sample depth images. To capture realistic output grain distributions, the cases where two grains come to lie on top of each other must be considered. The neural network can be trained to detect such overlaps and still determine the volume of the sample grains.

BRIEF DESCRIPTION OF THE DRAWINGS

In the drawings, the subject matter of the invention is shown by way of example, wherein.

DETAILED DESCRIPTION OF THE PREFERRED EMBODIMENTS

Figure 1:
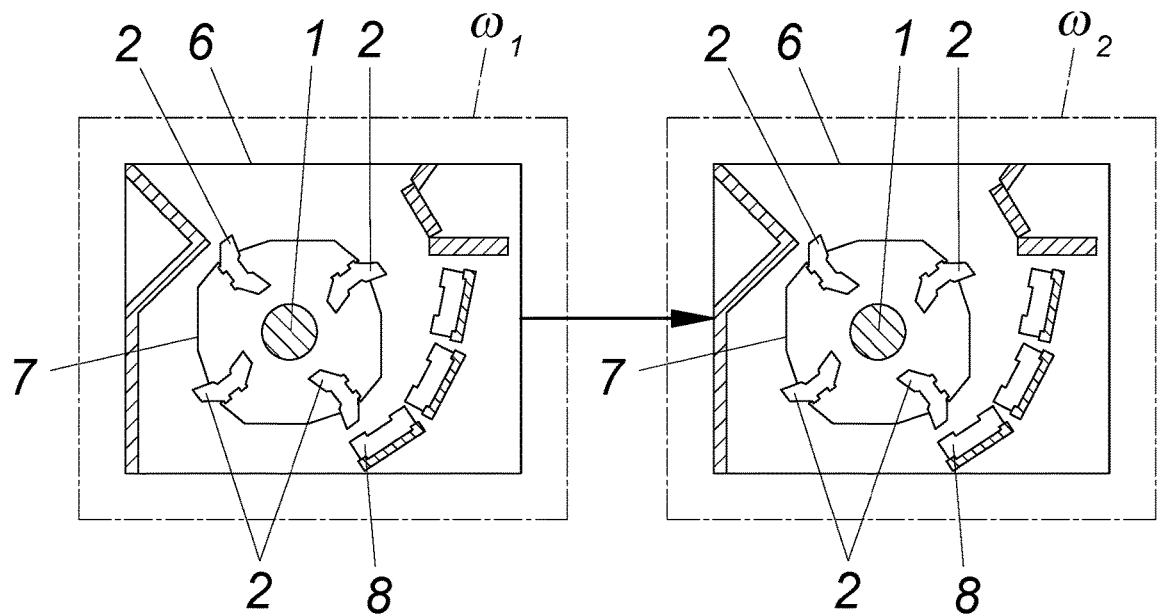
FIG. 1 shows a schematic representation of an acceleration process when carrying out a method according to the invention.

A method according to the invention can be used for wear detection in crushers with a wearing part 2 mounted on a drive shaft 1 in idle running. In this process, the drive shaft 1 is accelerated from a starting angular velocity $\omega_1$ to an end angular velocity $\omega_2$ with a predetermined acceleration and the drive energy required for this is determined, whereupon the wear of the wearing part 2 is determined as the value assigned to the required drive energy in a predetermined wearing-part characteristic curve 3, 4, 5. The crusher may, for example, be an impact crusher having a crushing chamber 6, wherein the wearing part 2 may comprise one or more impact bars, as is schematically indicated in FIG. 1. In this case, the wearing part 2 is arranged on a rotor 7 that is drive-connected to the drive shaft 1 and interacts with at least one impact plate 8 to form a crushing gap.

Figure 2:
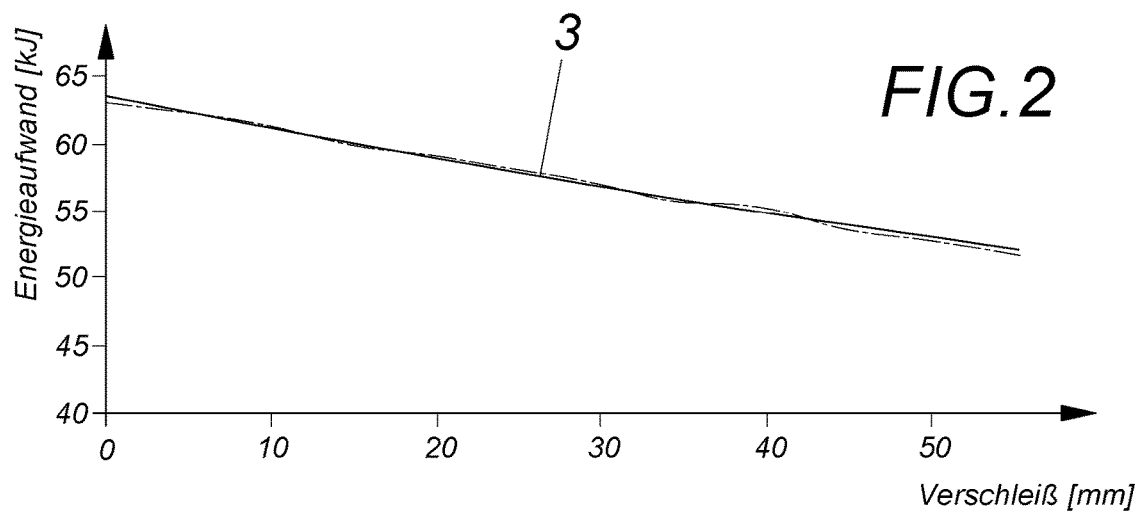
FIG. 2 shows a wearing-part characteristic curve between the wear of a wearing part and the energy required for acceleration for a first arrangement of a wearing part on a drive shaft.
Figure 3:
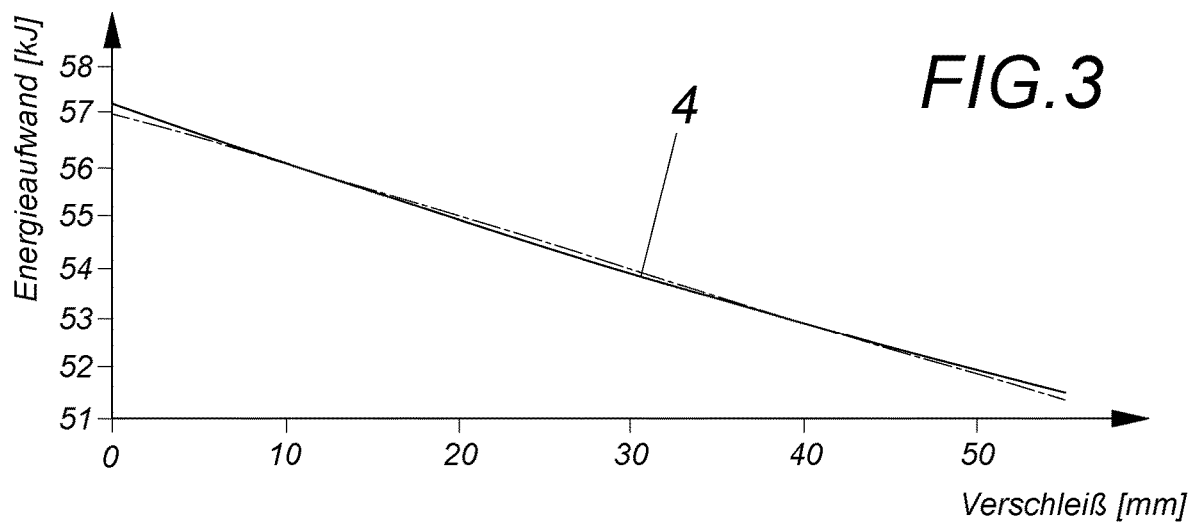
FIG. 3 shows a wearing-part characteristic curve corresponding to FIG. 2 for a second arrangement of a wearing part on a drive shaft.
Figure 4:
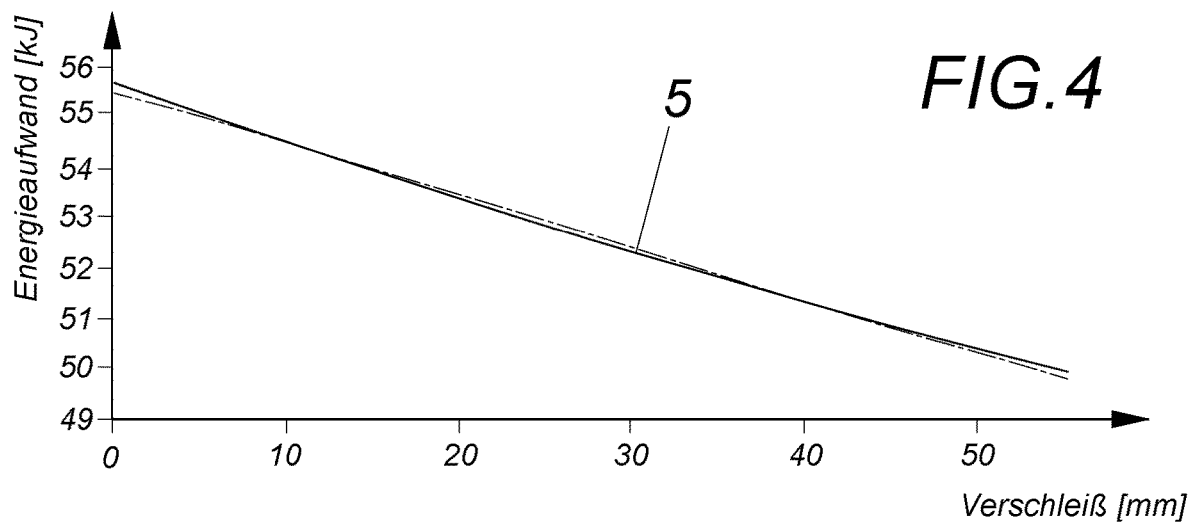
FIG. 4 shows a wearing-part characteristic curve corresponding to FIG. 2 for a third arrangement of a wearing part on a drive shaft.

FIGS. 2 to 4 each show wearing-part characteristic curves 3, 4 and 5 determined for different arrangements of a wearing part 2 on the drive shaft 1, with a linear regression line being created in each case as an approximation to the calculated individual values. The wearing-part characteristic curve 3 shown in FIG. 2 refers to an arrangement of four impact bars with a given geometry and density. This arrangement is also shown schematically in FIG. 1. Wearing-part characteristic curve 4 of FIG. 3 refers to an arrangement comprising two impact bars according to wearing-part characteristic curve 3 as well as two dummy bars. Finally, FIG. 4 shows an example of a third arrangement which also comprises two dummy bars and two impact bars with a defined partial wear according to wearing-part characteristic curve 3.

In the case of an impact crusher, in order to determine one of the wearing-part characteristic curves 3, 4, 5 for a specified arrangement of the wearing part 2 on the drive shaft 1 with a known wearing part density or geometry and thus a known moment of inertia, a reference run can first be performed at a given acceleration from a starting angular velocity $\omega_1$ to an end angular velocity $\omega_2$. During this process, the drive power can be measured, which in turn can be used to determine the required reference energy input for the acceleration process. Assuming geometric simplifications and uniform wear, this reference energy expenditure can be assigned the wear value 0 in relation to the change in the geometry of the wearing part. In order to subsequently determine a wearing-part characteristic curve, the theoretical energy expenditure during the specified acceleration travel can be determined for any wear values by determining its mass via the geometry change of the wearing part at a specified density of the wearing part and the required drive power via the moment of inertia acting on the drive shaft, and thus the theoretical energy expenditure during acceleration from a starting angular velocity $\omega_1$ to an end angular velocity $\omega_2$. In the simplest case, this is a substantially linear relationship between the energy expenditure in kJ required for the given acceleration process and the change in the geometry of the wearing part 2 in mm. For example, the change in length of the wearing part in a wear direction can be taken as the wear.

Therefore, in order to determine the wear for a particular arrangement of the wearing part 2 on the drive shaft 1 with the aid of a method according to the invention, the different wearing-part characteristic curves 3, 4, 5 can be assigned to and selected from a set of wearing-part characteristic curves.

Figure 5:
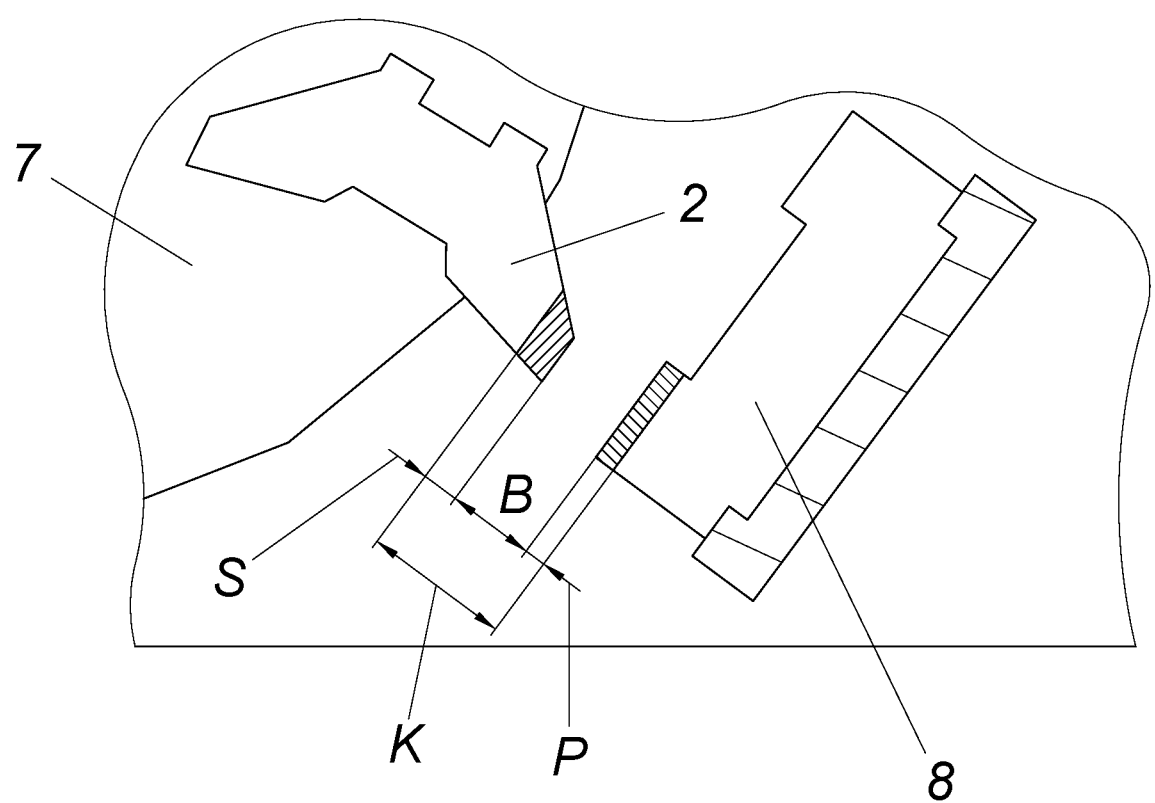
FIG. 5 shows a detailed view of a wearing part and an impact plate cooperating with it according to FIG. 1 on a larger scale.

As indicated in FIG. 5, the impact plate wear of an impact plate 8 during operation of the impact crusher can also be determined by means of a method according to the invention. In this case, the actual reference grain diameter is determined for the output grain of the impact crusher, which is larger than the respective grain diameter of a predetermined volume fraction of the output grain. Accordingly, the total wear is given as the difference between an actual crushing gap K associated with the determined actual reference grain diameter and a predetermined nominal crushing gap. Therefore, if the total wear, as well as the wear S of a wearing part 2 is known, the impact plate wear P can be determined as the difference between the actual crushing gap K associated with the actual reference grain diameter and the sum of the wear S of a wearing part 2 and the predetermined nominal crushing gap B.

The invention claimed is:

1. A method for detecting wear in a crusher in idle operation, the crusher having a wearing part mounted on a drive shaft, said method comprising:
   accelerating the drive shaft from a starting angular velocity ($\omega 1$) to an end angular velocity ($\omega 2$) with a predetermined acceleration; and
   determining the drive energy required for the accelerating; and
   determining the wear of the wearing part as a value associated with the required drive energy in a predetermined wearing-part characteristic curve.

2. The method according to claim 1, wherein the wearing part is supported on the drive shaft in an arrangement, and the predetermined wearing-part characteristic curve for the arrangement of the wearing part on the drive shaft is selected from a set of wearing-part characteristic curves of different possible arrangements.

3. The method according to claim 2, wherein the wearing part is one or more impact bars of an impact crusher interacting with an impact plate, and wherein an actual reference grain diameter of output grain of the impact crusher is determined that is larger than a grain diameter of a predetermined volume fraction of the output grain, and the method further comprises determining a total wear as a difference between an actual crushing gap associated with the actual reference grain diameter, and a predetermined nominal crushing gap.

4. The method according to claim 3, wherein the method further comprises moving an impact rocker closer to the wearing part by an amount of the total wear for the predetermined nominal crushing gap of the impact crusher.

5. The method according to claim 4, wherein the method further comprises determining, when the wearing part has wear that is known, a reference grain diameter for different crushing gaps, wherein the reference grain diameter is larger than a grain diameter of a predetermined volume fraction of output grain and is associated with a crushing gap in a crushing gap characteristic curve.

6. The method according to claim 2, wherein the method further comprises determining, when the wearing part has wear that is known, a reference grain diameter for different crushing gaps, wherein the reference grain diameter is larger than a grain diameter of a predetermined volume fraction of output grain and is associated with a crushing gap in a crushing gap characteristic curve.

7. The method according to claim 3, wherein the method further comprises determining, when the wearing part has wear that is known, a reference grain diameter for different crushing gaps, wherein the reference grain diameter is larger than a grain diameter of a predetermined volume fraction of output grain and is associated with a crushing gap in a crushing gap characteristic curve.

8. The method according to claim 1, wherein the wearing part is one or more impact bars of an impact crusher interacting with an impact plate, and wherein an actual reference grain diameter of output grain of the impact crusher is determined that is larger than a grain diameter of a predetermined volume fraction of the output grain, and the method further comprises determining a total wear as a difference between an actual crushing gap associated with the actual reference grain diameter, and a predetermined nominal crushing gap.

9. The method according to claim 8, wherein the method further comprises moving an impact rocker closer to the wearing part by an amount of the total wear for the predetermined nominal crushing gap of the impact crusher.

10. The method according to claim 9, wherein the method further comprises determining, when the wearing part has wear that is known, a reference grain diameter for different crushing gaps, wherein the reference grain diameter is larger than a grain diameter of a predetermined volume fraction of output grain and is associated with a crushing gap in a crushing gap characteristic curve.

11. The method according to claim 8, wherein the method further comprises determining the actual reference grain diameter transverse to the conveying direction of the output grain at different locations and determining the resulting impact plate wear for each location.

12. The method according to claim 8, wherein the method further comprises detecting a two-dimensional depth image of the output grain conveyed past a depth sensor in sections in a detection region by the depth sensor, and feeding the detected two-dimensional depth image to a previously trained convolutional neural network that has at least three successive convolutional layers and a downstream reference grain diameter classifier, and that outputs an output value as a grain diameter that is larger than the grain diameter of the predetermined volume fraction of the output grain.

13. The method according to claim 12, wherein the method further comprises removing from the depth image values of pixels having a depth that corresponds to a previously detected distance between the depth sensor and a background for said pixel or exceeds said previously detected distance.

14. The method according to claim 8, wherein the method further comprises determining, when the wearing part has wear that is known, a reference grain diameter for different crushing gaps, wherein the reference grain diameter is larger than a grain diameter of a predetermined volume fraction of output grain and is associated with a crushing gap in a crushing gap characteristic curve.

15. The method according to claim 1, wherein the wearing part includes an impact bar interacting with an impact plate of an impact crusher, and the method further comprises determining an actual reference grain diameter of output grain of the impact crusher that is larger than a grain diameter of a predetermined volume fraction of the output grain, and determining wear of the impact plate as a difference between an actual crushing gap associated with the actual reference grain diameter and a sum of wear of the impact bar and a predetermined nominal crushing gap.

16. The method according to claim 15, wherein the method further comprises determining, when the wearing part has wear that is known, a reference grain diameter for different crushing gaps, wherein the reference grain diameter is larger than a grain diameter of a predetermined volume fraction of output grain and is associated with a crushing gap in a crushing gap characteristic curve.

17. The method according to claim 1, wherein the method further comprises determining, when the wearing part has wear that is known, a reference grain diameter for different crushing gaps, wherein the reference grain diameter is larger than a grain diameter of a predetermined volume fraction of output grain and is associated with a crushing gap in a crushing gap characteristic curve.

18. A training method for training a neural network for a method according to claim 12, said training method comprising:
    acquiring and storing sample depth images of a sample grain with a known grain diameter together with the grain diameter;
    combining a plurality of sample depth images randomly so as to form a training depth image, to which the reference grain diameter of the combined sample depth images is assigned;
    feeding the training depth image to the neural network on an input side and the assigned reference grain diameter is fed to the neural network on an output side; and
    adapting weights of individual network nodes of the neural network in a learning step.

* * * * *